United States Statutory Invention Registration [19]

[11] Reg. Number: H636

Elliott et al. [43] Published: Jun. 6, 1989

[54] TORQUE LIMITED DRIVE FOR MANUAL VALVES

[75] Inventors: Philip G. Elliott, Metropolis, Ill.; Daniel E. Underwood, Paducah, Ky.

[73] Assignee: The United States of America as represented by the United States Department of Energy, Washington, D.C.

[21] Appl. No.: 248,224

[22] Filed: Sep. 15, 1988

[51] Int. Cl.[4] ..... F16K 31/44

[52] U.S. Cl. ..... 251/81; 192/56 R

[58] Field of Search ..... 192/54, 55, 56 R; 251/79, 80, 81

[56] References Cited

U.S. PATENT DOCUMENTS

| | | | |
|---|---|---|---|
| 622,912 | 4/1899 | Corey, Jr. | 251/81 |
| 2,148,481 | 2/1939 | Frank | 192/56 R |
| 2,608,377 | 8/1952 | Streun | 251/81 |
| 3,060,706 | 10/1962 | Hess | 251/79 |
| 3,441,115 | 4/1969 | Gunther | 251/81 |
| 3,455,331 | 7/1969 | Baumann et al. | 251/80 |
| 3,985,213 | 10/1976 | Braggins | 192/56 R |
| 4,637,502 | 1/1987 | Mayr et al. | 192/56 R |

FOREIGN PATENT DOCUMENTS

| | | | |
|---|---|---|---|
| 14820 | 6/1926 | Netherlands | 251/81 |

*Primary Examiner*—Deborah L. Kyle
*Assistant Examiner*—Michael J. Carone
*Attorney, Agent, or Firm*—Stephen D. Hamel; Judson R. Hightower

[57] ABSTRACT

The present invention is directed to a torque-limiting handwheel device for preventing manual valves from being damaged due to the application of excessive torque during the opening or closing operation of the valves. Torque can only be applied when ridges in the handwheel assembly engage in channels machined in the face of the baseplate. The amount of torque required for disengagement of the ridges from the channels is determined by the force exerted by various Bellville springs and the inclination of the side faces of the channels.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TORQUE LIMITED DRIVE FOR MANUAL VALVES

This invention was made as a result of the work done under contract DE-AC05-840R21400 with Martin Marietta Energy Systems, Inc., and the U.S. Department of Energy.

BACKGROUND OF THE INVENTION

The present invention relates generally to a torque limiting handwheel for preventing manual valves from being damaged because of the excessive application of torque during the opening and closing operation of the valves.

Because of the variety (manufacturer and size) of valves, it is difficult for operators to keep up with the torque limits of each particular valve. The application of excessive torque has been the cause of many valve failures. Operator judgment becomes a frequent substitute for a torque wrench. When excessive valve seat leakage occurs, it is a natural tendency to apply excessive torque to the valve to correct the valve seat leakage. It is costly and time consuming to replace the damaged valve seats due to excessive torquing by the operators.

It is, accordingly, a general object of this invention to develop a torque-limiting handwheel which when installed on a valve, prevents the valve from being damaged through the application of excessive torque during operation of the valve.

Another more particular object of the invention is to provide a torque-limiting handwheel wherein an almost infinite range of maximum torque levels may be achieved.

Yet another object of the invention is to provide a torque-limiting device for manual valves wherein a common set of hardware can accommodate a wide range of valves having different allowable operating torques.

Another object of the invention was to devise a torque limiting feature for manual valves which can be applied as an integral part of a valve handwheel, the valve lazy rod, separate from the valve or be incorporated into a valve wrench.

SUMMARY OF THE INVENTION

A torque-limiting drive for preventing manual valves from being damaged due to the application of excessive torque during the opening or closing operation of the valves is provided in accordance with this invention. The torque-limiting device comprises a base plate member having channels radially disposed on its upper surface from a central bore. A handwheel member with ridges radially disposed on its lower surface at corresponding radial positions respectively engage and disengage the aforesaid channels to limit the torque on the device. Torque can only be applied when the ridges in the handwheel assembly are engaged in the channels machined in the baseplate of the device. Compression of various Bellville springs, and the inclination of the engaging side surfaces of the respective ridges and channels determine the amount of torque which will cause disengagement of the ridges from the channels. Therefore, valve torque limits can be adjusted with a single set of hardware by simply adjusting the compression of the Bellville springs.

It is, accordingly, a general object of the invention to provide a torque-limiting handwheel which when installed on valves, prevents the valves from being damaged by the application of excessive torque during the valve operation.

Other and further objects will be obvious upon an examination of the illustrative embodiment about to be described or will be indicated in the appended claims, and various advantages not referred to herein will occur to one skilled in the art upon employment of the invention in practice.

DETAILED DESCRIPTION OF THE INVENTION

As briefly mentioned above, the present invention is directed to providing a torque-limiting handwheel device for preventing manual valves from being damaged by an excessive application of torque during the opening and closing operation of the valves. The torque-limiting device consists of a valve assembly with a steel baseplate having radially disposed channels or grooves on its upper surface and a handwheel member with ridges on its lower surface that respectively engage and disengage the channels to limit the torque on the device.

Figure 1:
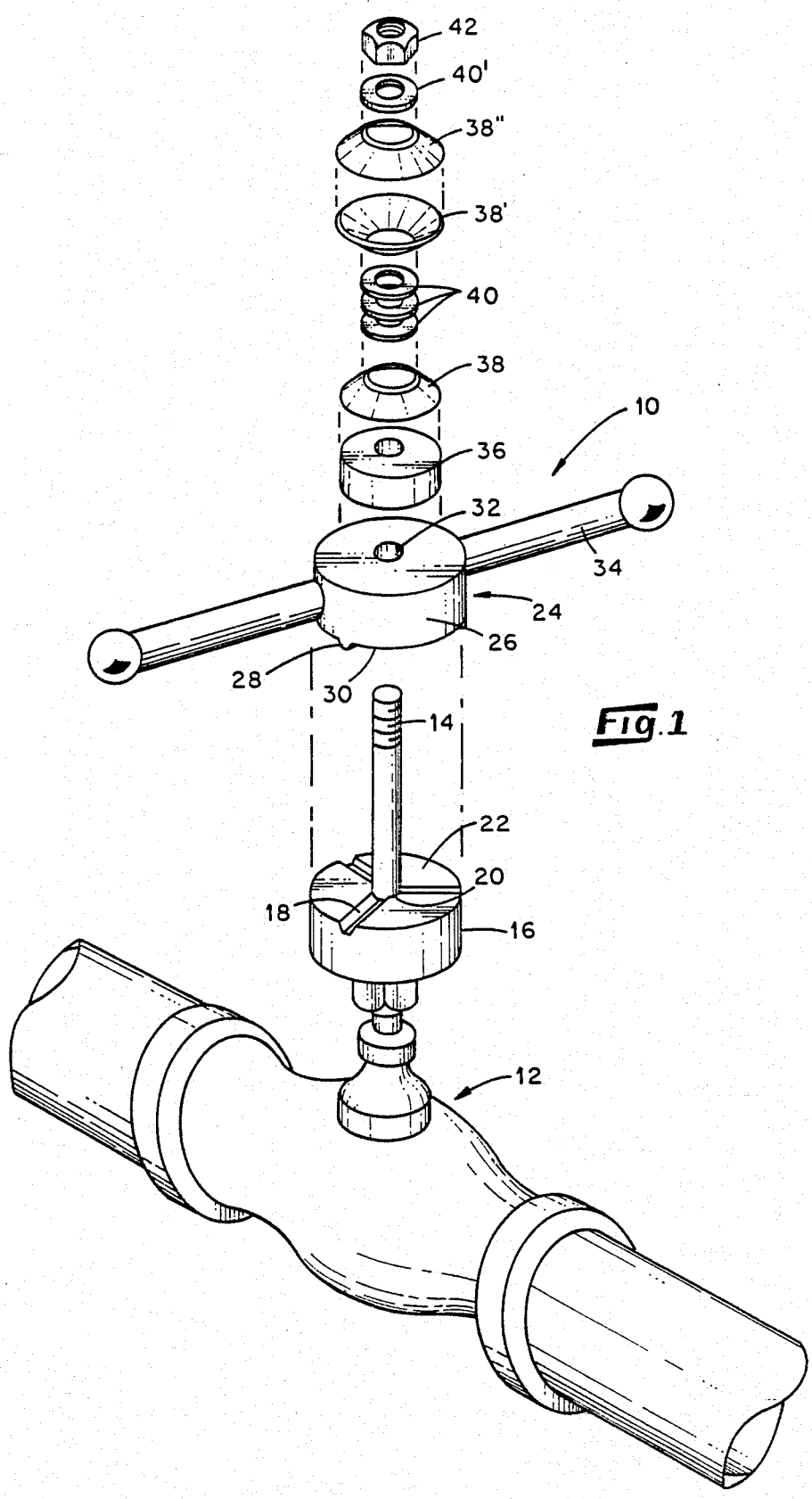
FIG. 1 is an exploded isometric view showing the torque-limiting fixture in accordance with the present invention.
Figure 2:
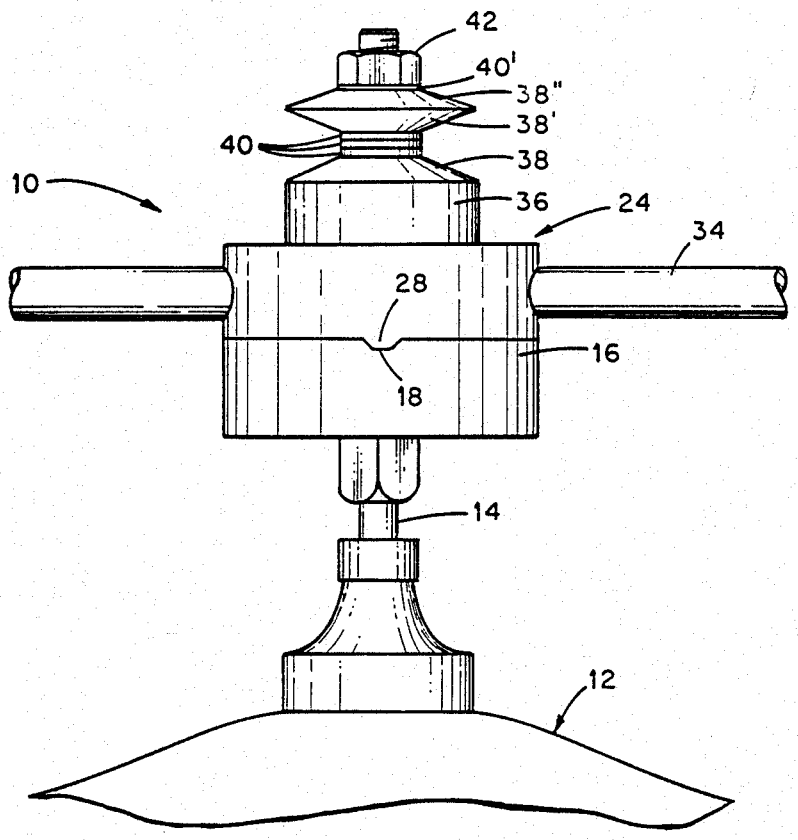
FIG. 2 is an assembled side view of the torque-limiting fixture.

Described in general detail and with reference to the accompanying drawings, the torque-limiting device assembly is shown at 10 in FIG. 1 where it is used in conjunction with a valve assembly 12 having a threaded valve stem 14. Threaded valve stem 14 accommodates a heat treated baseplate member 16 having channels or grooves 18 radially disposed at 120° intervals from central bore 20, on its upper surface 22.

Handle wheel assembly 24, includes an upper plate 26 defining ridges 28 on its lower surface 30, which are radially disposed from central bore 32 at 120° intervals so as to engage channels 18 in baseplate member 16 when the handle assembly is being operated within its torque limits. Handle 34 attached to upper plate 26 allows for a rotating movement of plate 26 about stem 14 during opening or closing of valve assembly 12. As shown, handle wheel assembly 24 further includes spacer 36, a plurality of Bellville springs 38, 38′, 38″ and spacers 40–40′ disposed coaxially on threaded valve stem 14. Nut 42 on threaded valve stem 14 completes the assembly.

In operation, valve assembly 12 with threaded valve stem 14 being centrally disposed and fixably attached to baseplate 16, along with handwheel assembly 24, which is rotatably supported on valve stem 14, allows member 24 to rotate independently about threaded valve stem 14 when the torque limits of the subject device are exceeded and ridges 28 are disengaged from channels 18. The interface of surfaces 22 and 30 are provided with a grease lubricant to improve the repeatability of the maximum torque levels achieved during cyclic functioning of the device.

The amount of torque required to release baseplate 16 from handwheel assembly 24 is a function of the forces applied to members 16 and 24 by the plurality of stacked Bellville springs 38–38′–38″ and washers 40 and 40′ and the inclination of the slopng side surfaces of channels 18 and ridges 28.

In the preferred embodiment, channels 18 in surface 22 of baseplate 16 have a depth of 0.10-inch, a top width of 0.20-inch, tapering downward at a 45° angle to a bottom width of 0.10-inch. Ridges 28 in handwheel assembly 26 thus are machined correspondingly to mate with channels 12.

A wide range of torque levels is achievable within the limits imposed by the strength of materials from which the device is fabricated. Variations in torque-resistance or resilience are obtained initially by selecting the angle of the incline of the side surfaces channels 18 and ridges 28 by which the two main members, baseplate 16 and handwheel assembly 24 are engaged with smaller singles providing lower torque limits.

The effect on torque (in./lbs.) of increasing the number of washers 40 between Bellville springs to increase the spring compression can be seen in table 1 where, in a typical test, 25 data points for each variation was made. The effect of changing the number of spacing washers 40 is to increase or decrease the deflection of the Bellville springs, thereby providing an increase or decrease in the force driving baseplate 16 and upper plate 26 together. Larger forces between plates 16 and 26 will provide a corresponding increase in the torque needed to cause relative rotation of those plates due to the engagement of ridges 28 in grooves 18 with greater force will be more resistant to disengagement.

TABLE I

| Data Points | Torque (in/lbs) for Washers, number 0 | 1 | 2 | 3 | 4 | 5 | 6 |
|---|---|---|---|---|---|---|---|
| | 115 | 127 | 130 | 167 | 177 | 216 | 228 |
| | 103 | 112 | 152 | 149 | 176 | 193 | 211 |
| | 110 | 134 | 144 | 145 | 179 | 184 | 198 |
| | 110 | 123 | 135 | 161 | 171 | 196 | 218 |
| | 112 | 115 | 150 | 147 | 179 | 201 | 208 |
| | 100 | 128 | 145 | 164 | 174 | 184 | 210 |
| | 112 | 122 | 147 | 159 | 183 | 193 | 206 |
| | 113 | 113 | 145 | 150 | 177 | 199 | 208 |
| | 98 | 132 | 132 | 166 | 166 | 183 | 201 |
| | 115 | 123 | 145 | 155 | 177 | 196 | 211 |
| | 105 | 113 | 140 | 142 | 169 | 196 | 210 |
| | 96 | 128 | 134 | 164 | 167 | 184 | 198 |
| | 110 | 117 | 142 | 154 | 177 | 198 | 211 |
| | 103 | 112 | 132 | 145 | 177 | 191 | 208 |
| | 96 | 130 | 149 | 162 | 167 | 186 | 203 |
| | 112 | 120 | 144 | 159 | 177 | 198 | 210 |
| | 101 | 113 | 132 | 144 | 177 | 199 | 208 |
| | 95 | 130 | 149 | 161 | 167 | 184 | 203 |
| | 110 | 120 | 144 | 162 | 176 | 198 | 211 |
| | 105 | 113 | 127 | 152 | 174 | 199 | 208 |
| | 100 | 127 | 152 | 164 | 166 | 184 | 199 |
| | 108 | 113 | 144 | 162 | 176 | 199 | 208 |
| | 103 | 128 | 135 | 147 | 174 | 188 | 204 |
| | 100 | 123 | 149 | 161 | 167 | 181 | 199 |
| | 108 | 127 | 145 | 161 | 176 | 183 | 210 |
| Average | 106 | 121 | 142 | 156 | 174 | 193 | 207 |

Torque was measured electronically utilizing strain gages affixed to a simulated valve stem and calibrated to cover the range of 0 to 2400 in. lbs. Increasing the numbers of 0.010 washer results in a generally linear increase in torque from 106 in. lbs. to 207 in. lbs. for a case using the 0.047-in Bellville springs.

Turning to Table II, estimated torques are given for the invention wherein three Bellville springs are used in combination with various numbers of washers. Using three types of Bellville springs (Type I =0.047-inch, Type II=0.087-inch, Type III=0.112-inch) and the indicated number of washers, maximum operating torques of from 33–2100 in. lbs. are achievable.

TABLE II

| Torques achievable with this device, inch-pounds | Three Bellville Springs, Type | 0.010 Washers, Quantity |
|---|---|---|
| 33 | I | 0 |
| 61 | I | 1 |
| 89 | I | 2 |
| 100 | II | 0 |
| 116 | I | 3 |
| 144 | I | 4 |
| 172 | I | 5 |
| 200 | I | 6 |
| 300 | II | 1 |
| 350 | III | 0 |
| 500 | II | 2 |
| 700 | III | 1 |
| 700 | II | 3 |
| 900 | II | 4 |
| 1050 | III | 2 |
| 1100 | II | 5 |
| 1400 | III | 3 |
| 1750 | III | 4 |
| 2100 | III | 5 |

On the basis of this data it is now possible to utilize a common set of hardware to accommodate a plurality of commercial valves having a wide range of allowable operating torques. Thus, by varying spacer thickness and/or number; varying Bellville spring thickness and/or number; or by varying the Bellville spring arrangement, all within a constant space, a predetermined and precise torque can be supplied for any given application.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. For example, further variations in torque resistance or resilience may be obtained by varying the angle of the incline of the channels and ridges by which the two main members are engaged. One skilled in the art will also recognize that it is now possible to utilize a common set of hardware to accommodate a plurality of commercial valves having a wide range of allowable operating torques. It will also be recognized that a variation in torque limit can be achieved without the use of different numbers of spacer washers by simply advancing or withdrawing nut 42 along the threaded end of stem 14 to effect a greater or lesser compression of the Bellville springs 38. Calibrating marks could be provided on stem 14 to indicate the axial position of nut 42 and the torque limit associated with that position. It is intended that the scope of the invention be defined by the claims appended hereto.

We claim:

1. In a manually operated valve assembly including a rotatable valve stem for opening and closing the valve assembly, the improvement comprising a torque-limiting handwheel for preventing damage to said valve assembly caused by the excessive application of torque to said stem, said handwheel comprising:

a first plate fixably attached to said stem and rotatable therewith, said first plate having a generally planar surface disposed orthagonal to the longitudinal axis of said stem and defining at least one radially extending groove;

a second plate rotatably attached to said stem having a generally planar surface disposed orthagonal to the longitudinal axis of said stem and defining at least one radially extending ridge shaped to mate with said groove in said first plate, said planer surfaces in said first and second plates being disposed in a continuous manner with said ridge and channels in said respective plates being engaged when said valve is operating within defined torque limits;

means for manually imparting torque to said second plate to rotate said second plate during valve operation;

means urging said first and second plates together to maintain said ridge and grove in mating relationships during normal valve operation.

2. The improvement of claim 1 wherein there are three radially extending grooves spaced 120° apart in said first plate and three radially extending ridges spaced 120° apart in said second plate.

3. The improvement of claim 1 wherein said means for urging said first and second plate together comprises at least one Bellville spring disposed on said stem and means compressively securing and spring against said second plate to force said second plate against said first plate.

4. The improvement of claim 3 further including at least one spacer washer mounted on said shaft to maintain a selected level of compression of said Bellville spring.

* * * * *